US009721687B2

(12) United States Patent
Sprague et al.

(10) Patent No.: US 9,721,687 B2
(45) Date of Patent: Aug. 1, 2017

(54) METHOD OF STORING A CHIMNEY ASSEMBLY OF A REACTOR PRESSURE VESSEL DURING A NUCLEAR REACTOR OUTAGE

(71) Applicants: Robin D. Sprague, Wilmington, NC (US); David Jonathan Keck, Wilmington, NC (US)

(72) Inventors: Robin D. Sprague, Wilmington, NC (US); David Jonathan Keck, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 637 days.

(21) Appl. No.: 14/453,118

(22) Filed: Aug. 6, 2014

(65) Prior Publication Data

US 2016/0042820 A1 Feb. 11, 2016

(51) Int. Cl.
*G21C 19/32* (2006.01)
*G21C 1/32* (2006.01)
(Continued)

(52) U.S. Cl.
CPC ............ *G21C 19/32* (2013.01); *G21C 1/084* (2013.01); *G21C 1/322* (2013.01); *G21C 15/26* (2013.01); *Y02E 30/31* (2013.01)

(58) Field of Classification Search
CPC ........ G21C 19/32; G21C 15/26; G21C 1/084; G21C 1/322; Y02E 30/31
(Continued)

(56) References Cited

U.S. PATENT DOCUMENTS 2,994,657 A    8/1961  Petrick et al.
5,180,547 A *  1/1993  Van Kuijk ............ G21C 1/084
                                                   376/377
(Continued)

FOREIGN PATENT DOCUMENTS

EP    0560592 A1   9/1993
JP    0259697 A    2/1990
(Continued)

OTHER PUBLICATIONS

PCT Search Report and Written Opinion issued in connection with corresponding Application No. PCT/US2015/043351 on Dec. 17, 2015.

*Primary Examiner* — Jack W Keith
*Assistant Examiner* — Daniel Wasil
(74) *Attorney, Agent, or Firm* — Harness, Dickey & Pierce, P.L.C.

(57) ABSTRACT

A method of storing a chimney assembly of a reactor pressure vessel during a nuclear reactor outage includes detaching a chimney barrel with upper chimney partitions therein from a top guide assembly of the reactor pressure vessel. A height of the upper chimney partitions is less than a height of the chimney barrel so as to leave a plenum region in a top section of the chimney barrel. The top guide assembly includes lower chimney partitions therein. The lower chimney partitions are removed from the top guide assembly and inserted into the plenum region of the chimney barrel so as to be on the upper chimney partitions. As a result, the chimney assembly can be stored in a relatively compact form during a reactor outage. The chimney assembly includes a combination of at least the chimney barrel, the upper chimney partitions, and the lower chimney partitions.

10 Claims, 6 Drawing Sheets

(51) Int. Cl.
  *G21C 1/08*      (2006.01)
  *G21C 15/26*     (2006.01)
(58) Field of Classification Search
  USPC ......................................................... 376/260
  See application file for complete search history.

(56) References Cited

U.S. PATENT DOCUMENTS

| | | |
|---|---|---|
| 5,268,945 A | 12/1993 | Van Kuijk |
| 5,319,689 A | 6/1994 | Challberg |
| 5,519,744 A | 5/1996 | Relf |
| 5,857,006 A | 1/1999 | Oosterkamp et al. |
| 8,532,245 B2 | 9/2013 | Gilmore et al. |
| 8,675,808 B2 | 3/2014 | Abe et al. |
| 2007/0201607 A1 | 8/2007 | Watanabe et al. |

FOREIGN PATENT DOCUMENTS

| | | |
|---|---|---|
| JP | 2007232546 A | 9/2007 |
| WO | 2014076811 A1 | 5/2014 |

* cited by examiner

METHOD OF STORING A CHIMNEY ASSEMBLY OF A REACTOR PRESSURE VESSEL DURING A NUCLEAR REACTOR OUTAGE

BACKGROUND

Field

The present disclosure relates to the removal and storage of a chimney of a reactor pressure vessel (RPV) during a boiling water reactor (BWR) outage.

Description of Related Art

FIG. 1 is cutaway view of a conventional reactor pressure vessel. Referring to FIG. 1, the reactor pressure vessel 100 includes a core plate 118 within the core shroud 114. The core plate 118 is a circular plate with round openings and supports, inter alia, control rods and fuel assemblies including a plurality of fuel rods 116. The core plate 118 supports the core shroud 114 and may also be bolted to a support ledge in the core shroud 114. The core plate 118 also forms a partition within the core shroud 114, which causes the recirculation flow to pass into the fuel supports and through the fuel assemblies. The core shroud 114 is a cylindrical structure that separates the upward flow of coolant through the core from the downcomer annulus flow. A top guide 112 is bolted to the top of the core shroud 114. The top guide 112 is a grid structure that provides lateral support to the top of the fuel assemblies. Each opening in the grid structure of the top guide 112 can provide lateral support and guidance for four fuel assemblies (or in the case of peripheral openings, two or three fuel assemblies). A chimney 108 is a relatively long cylindrical structure that supports the steam separators 104 and is bolted to the top guide 112. Chimney partitions 110 are located inside the chimney 108 and are in the form of a single structure. The chimney partitions 110 act to channel the mixed steam and water flow exiting the core to limit the cross flow and minimize the potential for recirculating eddies. The steam separators 104 are on the chimney 108 and cover the plenum region 106. The steam separators 104 include a flat base (or a small dome) with an array of standpipes thereon and a separator structure at the top of each standpipe. The steam separators 104 separate the liquid water from the steam-water mixture rising therethrough. Steam from the steam separators 104 flows upward to the steam dryers 102 where additional moisture is removed and directed into a downcomer annulus between the outer wall of the chimney 108 and the inner wall of the reactor pressure vessel 100.

During a reactor outage such as a refueling outage, internal structures of the reactor pressure vessel 100 such as the chimney 108 and chimney partitions 110 need to be removed to access the fuel rods 116. However, the relatively large size of the chimney 108 and chimney partitions 110 therein may present issues with removal and storage during the reactor outage.

SUMMARY

A method of storing a chimney assembly of a reactor pressure vessel during a nuclear reactor outage may include detaching a chimney barrel with upper chimney partitions therein from a top guide assembly of the reactor pressure vessel. A height of the upper chimney partitions is less than a height of the chimney barrel so as to leave a plenum region in a top section of the chimney barrel. The top guide assembly includes lower chimney partitions therein. The method may additionally include removing the lower chimney partitions from the top guide assembly. The method may further include inserting the lower chimney partitions into the plenum region of the chimney barrel so as to be on the upper chimney partitions. The chimney assembly may be a combination of at least the chimney barrel, the upper chimney partitions, and the lower chimney partitions.

A chimney assembly of a reactor pressure vessel may include a chimney barrel, upper chimney partitions within the chimney barrel, and lower chimney partitions below the upper chimney partitions. A height of the upper chimney partitions is less than a height of the chimney barrel so as to leave a plenum region in a top section of the chimney barrel. The lower chimney partitions are separate and distinct structures from the upper chimney partitions.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
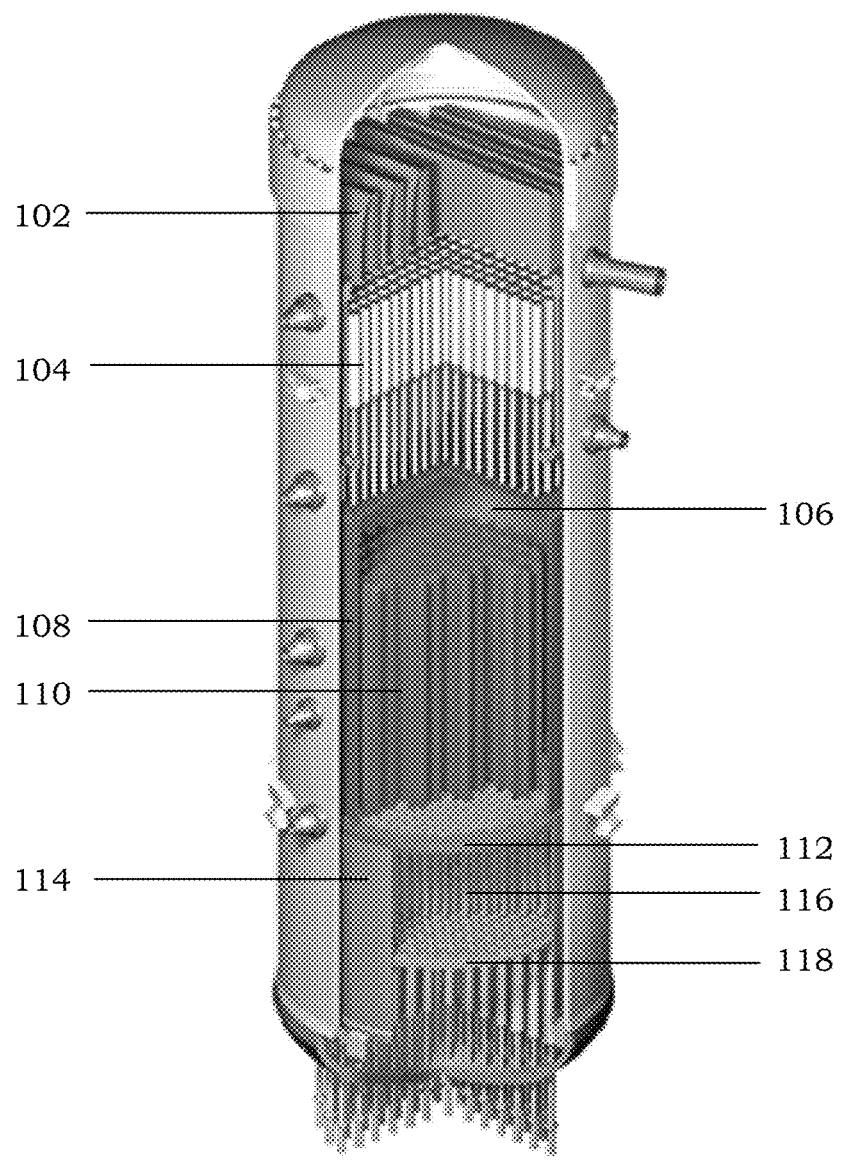
FIG. 1 is cutaway view of a conventional reactor pressure vessel.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 2:
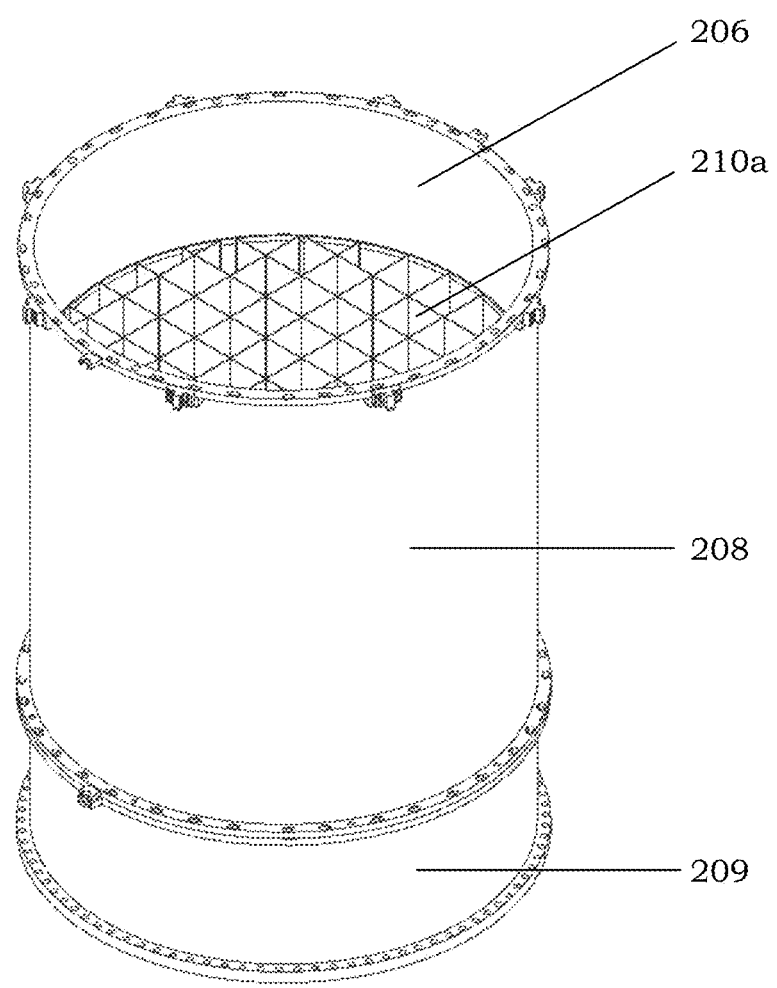
FIG. 2 is a perspective view of a chimney/top guide complex according to an example embodiment.
Figure 3:
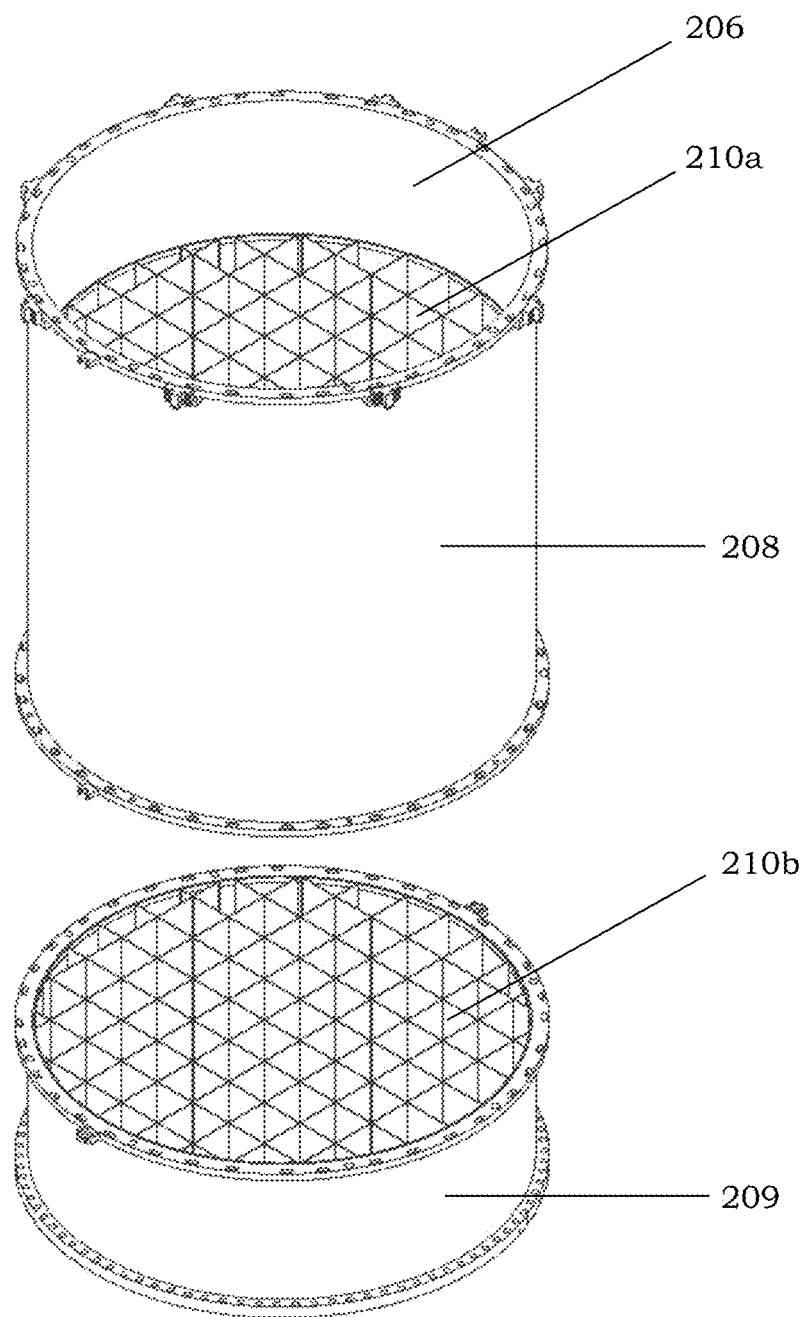
FIG. 3 is a perspective view of the detachment of the chimney barrel from the top guide assembly according to an example embodiment.

FIG. 2 is a perspective view of a chimney/top guide complex according to an example embodiment. The chimney/top guide complex includes a chimney barrel 208 and a top guide assembly 209. The chimney barrel 208 includes upper chimney partitions 210a and a plenum region 206. The top guide assembly 209 includes lower chimney partitions 210b (FIG. 3). When the chimney barrel 208 and the top guide assembly 209 are attached (e.g., bolted together), the upper chimney partitions 210a in the chimney barrel 208 are aligned with and adjoined to the lower chimney partitions 210b in the top guide assembly 209 so as to function as a single partition structure. As a result, the crisscrossing partition walls will share a common orientation such that the channels in the lower chimney partitions 210b will extend continuously through the upper chimney partitions 210a. For instance, the upper chimney partitions 210a may be positioned and connected to the lower chimney partitions 210b via a pin/slot or blade/slot arrangement, although example embodiments are not limited thereto.

Although not shown in FIG. 2, it should be understood that, when in a reactor pressure vessel, the chimney/top guide complex will be between the core shroud and the steam separators. In particular, the top guide assembly 209 will be secured to the core shroud, and the chimney barrel 208 will be secured to the steam separators. The upper chimney partitions 210a, the upper inner wall of the chimney barrel 208 above the upper chimney partitions 210a, and the steam separators will define the plenum region 206 therebetween. The combination of the chimney barrel 208, the upper chimney partitions 210a, and the lower chimney partitions 210b may be referred to herein as a chimney assembly.

Figure 4:
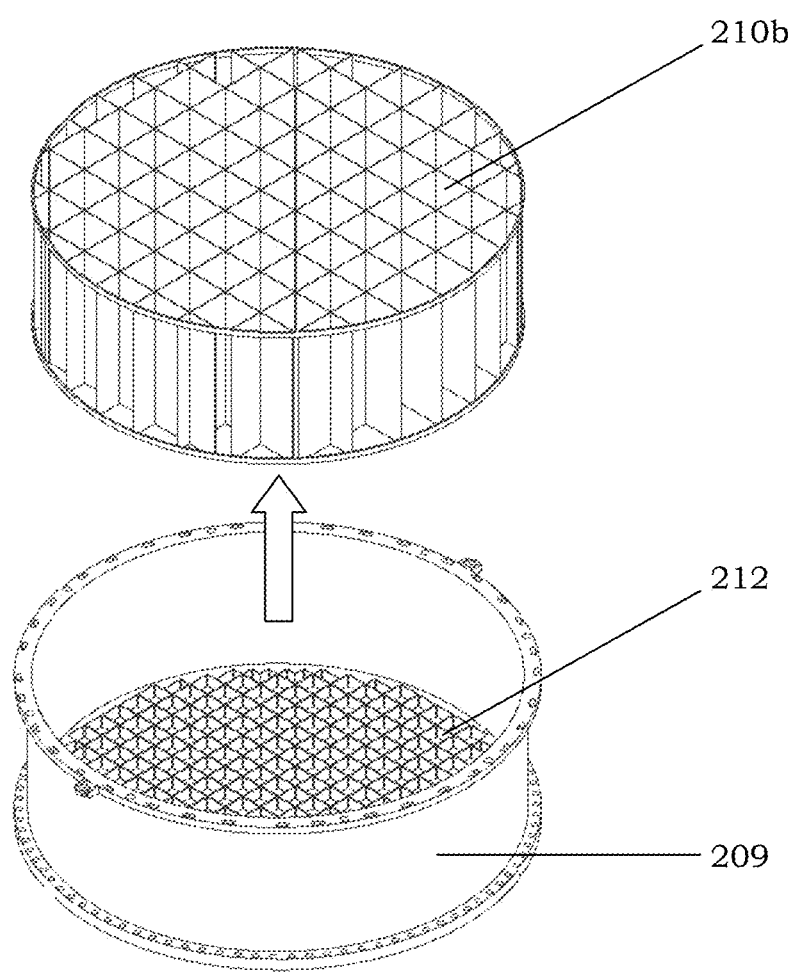
FIG. 4 is a perspective view of the removal of the lower chimney partitions from the top guide assembly according to an example embodiment.
Figure 5:
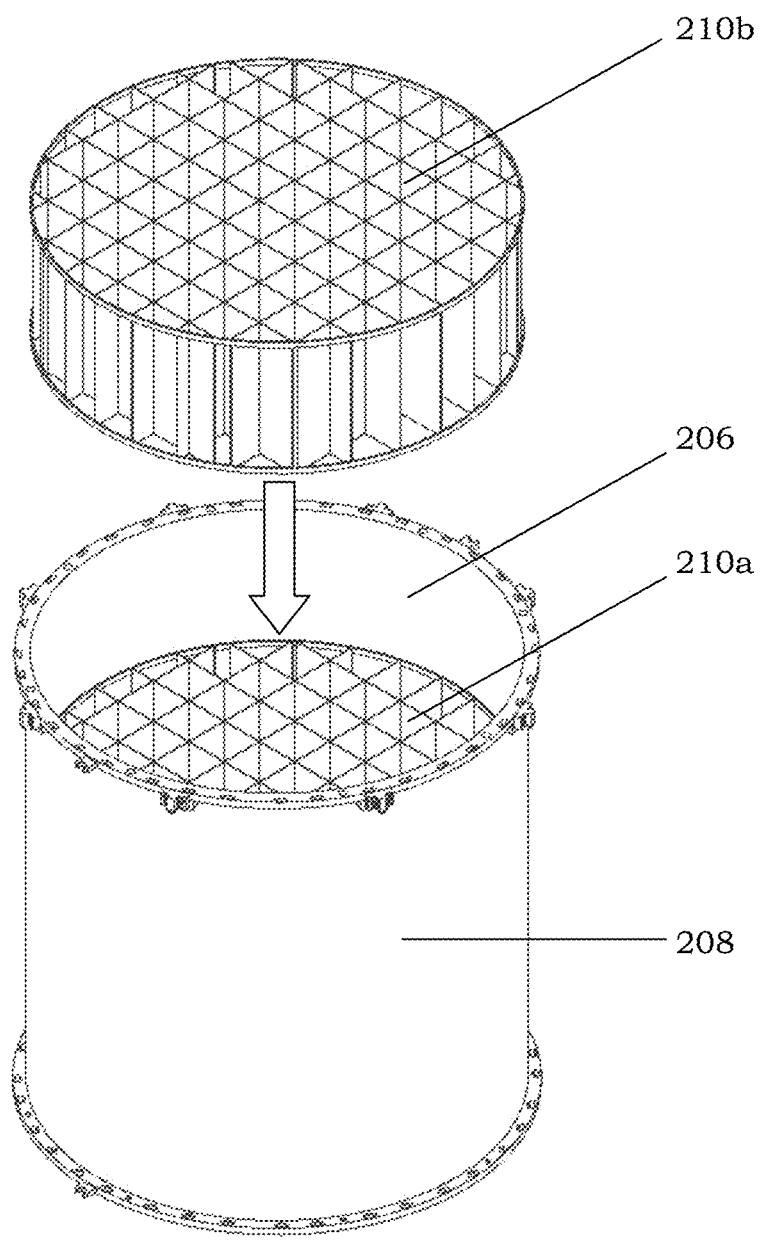
FIG. 5 is a perspective view of the insertion of the lower chimney partitions into the plenum region of the chimney barrel according to an example embodiment.
Figure 6:
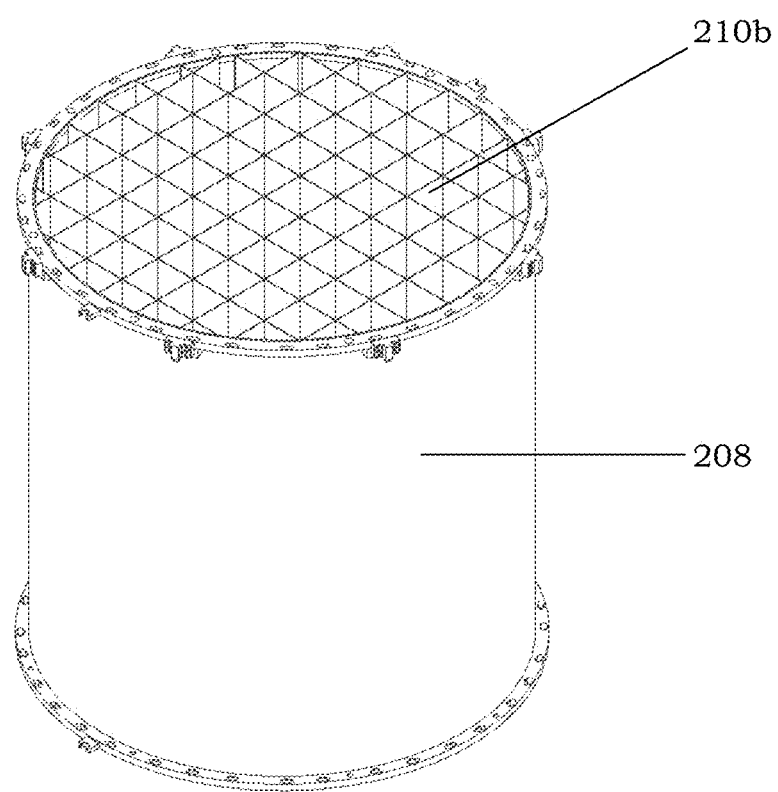
FIG. 6 is a perspective view of a chimney assembly that is in storage form according to an example embodiment.

A method of storing a chimney assembly of a reactor pressure vessel during a nuclear reactor outage is disclosed below in connection with FIGS. 3-6. As an overview, FIG. 3 is a perspective view of the detachment of the chimney barrel from the top guide assembly according to an example embodiment. FIG. 4 is a perspective view of the removal of the lower chimney partitions from the top guide assembly according to an example embodiment. FIG. 5 is a perspective view of the insertion of the lower chimney partitions into the plenum region of the chimney barrel according to an example embodiment. FIG. 6 is a perspective view of a chimney assembly that is in storage form according to an example embodiment.

As used herein, a nuclear reactor outage should be understood to mean a refueling outage or a non-refueling outage (such as a maintenance outage). Referring to FIG. 3, a method of storing a chimney assembly of a reactor pressure vessel during a nuclear reactor outage includes detaching a chimney barrel 208 from a top guide assembly 209 of the reactor pressure vessel. The chimney barrel 208 includes upper chimney partitions 210a therein. The upper chimney partitions 210a may be affixed (e.g., welded/bolted) to an interior of the chimney barrel 208. A height of the upper chimney partitions 210a is less than a height of the chimney barrel 208 so as to leave a plenum region 206 in a top section of the chimney barrel 208. The lower end of the upper chimney partitions 210a may be substantially even or flush with the bottom rim of the chimney barrel 208, although example embodiments are not limited thereto.

Once detached from the top guide assembly 209, the chimney barrel 208 with the upper chimney partitions 210a therein may be placed in a radiation-shielding storage location during the nuclear reactor outage. For instance, the chimney barrel 208 with the upper chimney partitions 210a therein may be submerged in a storage pool. The orientation of the chimney barrel 208 may also be maintained such that the plenum region 206 is above the upper chimney partitions 210a. For instance, the bottom rim of the chimney barrel 208 (that was previously joined to the top guide assembly 209 before detachment) may rest on the floor of the storage pool, although example embodiments are not limited thereto.

The top guide assembly 209 includes lower chimney partitions 210b therein. The lower chimney partitions 210b are not affixed to the top guide assembly 209. Instead, the lower chimney partitions 210b are supported by the top guide grid 212 (FIG. 4) and are removable from the top guide assembly 209 via lifting. The upper end of the lower chimney partitions 210b may also be substantially even or flush with the top rim of the top guide assembly 209. As a result, the channels of the lower chimney partitions 210b may have a relatively continuous transition with the channels of the upper chimney partitions 210a. The lower chimney partitions 210b may also have a substantially seamless connection with the upper chimney partitions 210a. The lower chimney partitions 210b may be oriented within the top guide assembly 209 with a pin/slot or blade/slot arrangement in order to provide a proper alignment with the upper chimney partitions 210a during the attached state (e.g., reattachment after the outage).

Although not shown in FIG. 3, it should be understood that other higher-positioned reactor components, such as the steam separators and the steam dryers, are first removed to allow access to the chimney/top guide complex.

Referring to FIG. 4, the lower chimney partitions 210b are removed from the top guide assembly 209. Because the lower chimney partitions 210b are not affixed to the top guide assembly 209 (like how the upper chimney partitions 210a are affixed to the chimney barrel 208), the lower chimney partitions 210b may be lifted from the top guide assembly 209 without having to engage in additional separation measures (e.g., cutting). The removal of the lower chimney partitions 210b exposes a top guide grid 212 of the top guide assembly 209. Although not shown, it should be understood that the top guide grid 212 of the top guide assembly 209 is fixed to a top end of a core shroud of the reactor pressure vessel.

Referring to FIG. 5, the lower chimney partitions 210b are inserted into the plenum region 206 of the chimney barrel 208 so as to be on the upper chimney partitions 210a. The plenum region 206 is configured to receive the lower chimney partitions 210b. In particular, the plenum region 206 has a size and shape that corresponds to a size and shape of the lower chimney partitions 210b. If the chimney barrel 208 is being kept in a storage pool during the nuclear reactor outage, then the lower chimney partitions 210b will also be submerged in the storage pool when disposed in the plenum region 206 of the chimney barrel 208.

Referring to FIG. 6, the chimney assembly is shown in storage form. The chimney assembly may be regarded as a combination of at least the chimney barrel 208, the upper chimney partitions 210a, and the lower chimney partitions 210b. Because the plenum region 206 has a size and shape that corresponds to a size and shape of the lower chimney partitions 210b, the lower chimney partitions 210b is readily received by the chimney barrel 208. The upper chimney partitions 210a and the lower chimney partitions 210b may have different heights. For instance, a height of the upper chimney partitions 210a may be more than a height of the lower chimney partitions 210b. In any event, it should be understood that, when the upper chimney partitions 210a are flush with a bottom surface of the chimney barrel 208, the empty space of the plenum region 206 can be fully utilized by having a height of the plenum region 206 be equal to a height of the lower chimney partitions 210b. In such an instance, a combined height of the upper chimney partitions 210a and the lower chimney partitions 210b will be equal to a total height of the chimney barrel 208. However, it should be understood that example embodiments are not limited thereto. For instance, a height of the plenum region 206 may be within ±25% (e.g., ±10%) of a height of the lower chimney partitions 210b. Thus, when inserted into the plenum region 206, the lower chimney partitions 210b may slightly below or above the rim of the chimney barrel 208.

After the desired refueling and/or maintenance is performed, the steps of the above-discussed method may be reversed to return the chimney assembly into the reactor pressure vessel. For instance, the lower chimney partitions 210b may be removed from the plenum region 206 of the chimney barrel 208 in the storage pool and returned to the reactor pressure vessel where the lower chimney partitions 210b are inserted into the top guide assembly 209. The chimney barrel 208 may then be removed from the storage pool and returned to the reactor pressure vessel where the chimney barrel 208 is attached to the top guide assembly 209. Because the upper chimney partitions 210a are affixed to an interior of the chimney barrel 208, the upper chimney partitions 210a will be moved together with the chimney barrel 208. The chimney barrel 208 is attached to the top guide assembly 209 such that the channels of the upper chimney partitions 210a are aligned with channels of the lower chimney partitions 210b. The lower chimney partitions 210b may be removably coupled to the upper chimney partitions 210a to help attain the proper alignment and/or to reduce flow-induced vibrations, although example embodiments are not limited thereto. For instance, the proper alignment of the channels may be achieved by orienting the chimney barrel 208 relative to the top guide assembly 209 without coupling the lower chimney partitions 210b to the upper chimney partitions 210a.

The reassembled chimney assembly of the reactor pressure vessel will include the chimney barrel 208, upper chimney partitions 210a within the chimney barrel 208, and the lower chimney partitions 210b below the upper chimney partitions 210a. As discussed above, the lower chimney partitions 210b are separate and distinct structures from the upper chimney partitions 210a. Because the height of the upper chimney partitions 210a is less than the height of the chimney barrel 208, there will be a plenum region 206 in a top section of the chimney barrel 208. As a result of the chimney partitions being in the form of upper chimney partitions 210a and lower chimney partitions 210b, the space provided by the plenum region 206 can be occupied by the lower chimney partitions 210b during a nuclear reactor outage, thereby allowing the chimney assembly to be stored in a more compact form.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:
1. A method of storing a chimney assembly of a reactor pressure vessel during a nuclear reactor outage, comprising:
   detaching a chimney barrel with upper chimney partitions therein from a top guide assembly of the reactor pressure vessel, a height of the upper chimney partitions being less than a height of the chimney barrel so as to leave a plenum region in a top section of the chimney barrel, the top guide assembly including lower chimney partitions therein;
   removing the lower chimney partitions from the top guide assembly; and
   inserting the lower chimney partitions into the plenum region of the chimney barrel so as to be on the upper chimney partitions, the chimney assembly being a combination of at least the chimney barrel, the upper chimney partitions, and the lower chimney partitions.

2. The method of claim 1, wherein the upper chimney partitions are affixed to an interior of the chimney barrel.

3. The method of claim 1, wherein the lower chimney partitions are not affixed to the top guide assembly, the lower chimney partitions being removable from the top guide assembly via lifting.

4. The method of claim 1, wherein the plenum region has a size and shape that corresponds to a size and shape of the lower chimney partitions.

5. The method of claim 1, wherein the detaching includes placing the chimney barrel with the upper chimney partitions in a radiation-shielding storage location during the nuclear reactor outage.

6. The method of claim 1, wherein the detaching includes submerging the chimney barrel with the upper chimney partitions therein in a storage pool.

7. The method of claim 6, wherein the inserting includes the lower chimney partitions being submerged in the storage pool.

8. The method of claim 1, wherein the detaching includes maintaining an orientation of the chimney barrel.

9. The method of claim 1, wherein the removing the lower chimney partitions includes exposing a top guide grid thereunder, the top guide grid being fixed to a top end of a core shroud of the reactor pressure vessel.

10. The method of claim 1, wherein the nuclear reactor outage is at least one of a refueling outage and a maintenance outage.

* * * * *